United States Patent [19]

Baune

[11] Patent Number: 4,993,974

[45] Date of Patent: Feb. 19, 1991

[54] ELECTRICAL CONNECTOR ELEMENT FOR ORBITAL STATIONS

[75] Inventor: Manfred Baune, Hassendorf, Fed. Rep. of Germany

[73] Assignee: Erno Raumfahrttechnik GmbH, Bremen, Fed. Rep. of Germany

[21] Appl. No.: 516,208

[22] Filed: Apr. 30, 1990

[30] Foreign Application Priority Data

May 2, 1989 [DE] Fed. Rep. of Germany ....... 3914511

[51] Int. Cl.$^5$ ........................................... H01R 13/00
[52] U.S. Cl. .................................................... 439/628
[58] Field of Search ................. 439/628, 660, 682–685

[56] References Cited

U.S. PATENT DOCUMENTS 3,409,860  11/1968  Kirby ................................... 439/628
4,850,899  7/1989  Maynard ............................. 439/628

Primary Examiner—Joseph H. McGlynn
Attorney, Agent, or Firm—Toren, McGeady & Associates

[57] ABSTRACT

A junction system serves for establishing an electrically conductive connection between a wiring system arranged at a first outer structure and a wiring system arranged at a second inner structure. The respective end regions of the wiring system which have to be interconnected constitute annular receptacles arranged coaxially in tandem, into which a prismatic connector element can be inserted from the outside which comprises on its outer side appropriately designed contact units extending in its longitudinal direction. The quantity of the contact units amounts to a whole or integral multiple of the quantity of the contact pairs to be connected, and these contact units are arranged at the junction element to be offset with respect to each other by a fixed rotational angle.

14 Claims, 1 Drawing Sheet

ELECTRICAL CONNECTOR ELEMENT FOR ORBITAL STATIONS

The present invention is directed to an interconnecting system for establishing an electrically conducting junction between a wiring system arranged at a first, outer structure and an associated wiring system arranged at a second inner structure, especially for manned orbital stations, where the inner structure is fastened in the outer structure so as to be detachable and replaceable.

BACKGROUND OF THE INVENTION

So as to be able to perform as large a quantity of experiments as possible independently of each other in an orbital station under cosmic state conditions, wherein the individual experiments are to begin and end at different times, so-called experimentation carriers have been developed which are also designated as orbital replaceable units (ORU). These are largely autonomous laboratory modules, which can be brought to the orbital station subsequently, for instance, also in the course of an in-orbit supply flight and which are then connected to the structure of the orbital station.

The orbital station itself is organized in "ORUs" so that the add-on components can also be exchanged if they fail. In this connection it is necessary to break and again to reestablish an electrically conducting interconnection between supply lines located on the orbital station structure and corresponding terminals at the experimentation carrier. One of the requirements specified herein is that these interconnection or interface points are to be accessible from the external side of the primary structure and are to be easily replaceable in case of possible damage.

SUMMARY OF THE INVENTION

The principal object of the present invention is to provide a junction system meeting these requirements, which is easy to handle and has a high degree of reliability.

In accordance with one aspect of the invention, the junction system comprises sets of contact elements, preferably resilient, provided in accessible locations on both the orbital station and experimentation carriers, cooperating with a removable and replaceable junction-forming member configured when installed to engage and electrically interconnect contact element sets. Preferably, both sets of contacts are arranged circumferentially around aligned bores in both the orbital station and the experimentation carriers. The junction element comprises a generally rod-shaped member which when inserted so as to extend into both bores functions to interconnect the respective contact element sets.

In accordance with a further aspect of the invention, the contact elements are arranged on the surface of the junction element so as to be angularly spaced by preset intervals, and the junction element is structured to fit into the bores in fixed angular positions, in each of which the desired electrical interconnections are achieved. As a result, should one set of contacts fail, the junction element can be withdrawn, rotated, and replaced to reestablish connections with a fresh set of contacts.

BRIEF DESCRIPTION OF THE DRAWING

Other objects and advantages will be apparent from the following detailed description of a preferred embodiment of the invention, taken in conjunction with the accompanying drawing, which is a vertical section through the interconnecting region of a carrier and station in accordance with the invention.

DETAILED DESCRIPTION OF THE PREFERRED EMBODIMENTS

Figure 1:
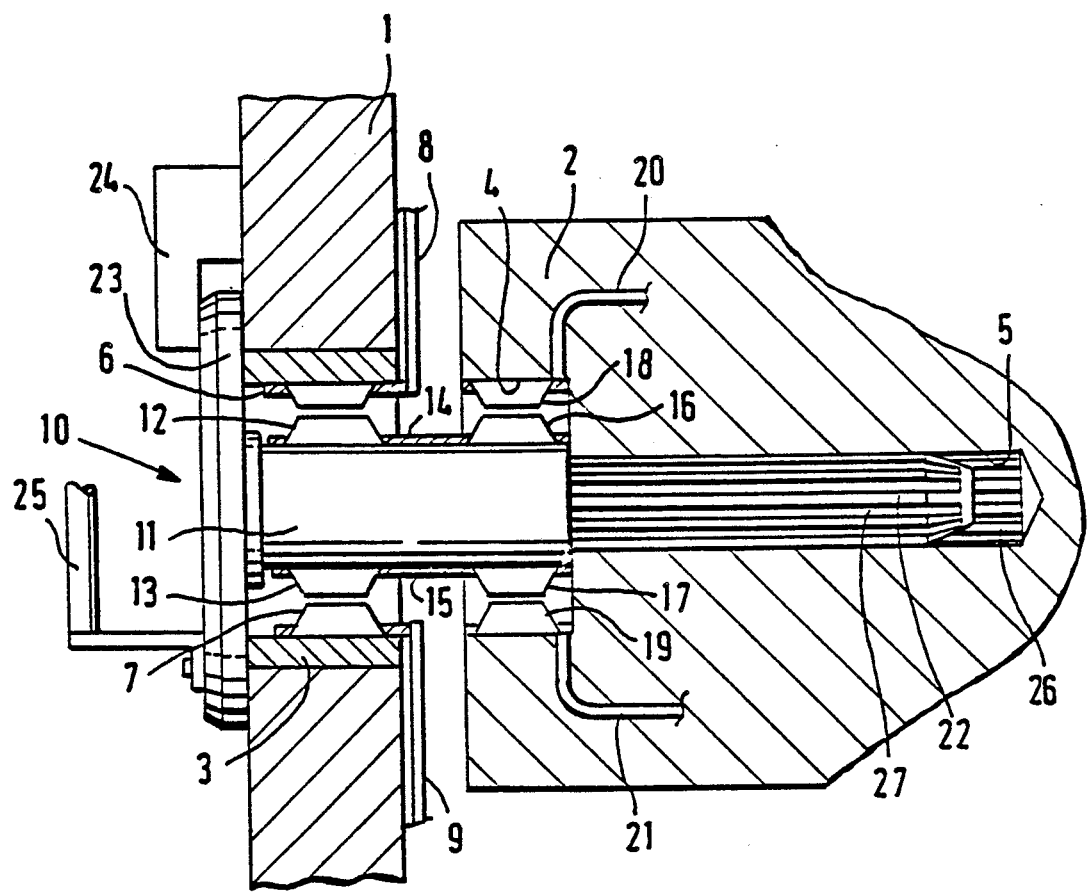

The sole FIGURE shows a vertical section through the interconnection region between the structure 1 of an orbital station and a carrier unit 2 for receiving an experimentation module, wherein the carrier unit 2 is detachably connected with the structure 1 of the orbital station.

The structure 1 of the orbital station is provided with a cylindrical throughbore, where an also cylindrical receiving bushing 3 is arranged. A cylindrical recess 4 is provided in the carrier unit 2 coaxially with the receiving bushing 3 with a dead end or blind bore 5 having a smaller diameter following upon said cylindrical recess 4.

Contact members 6 and 7, called a first set, configured as resilient tongues or lugs, are arranged in the receiving bushing 3 in an annular circumferentially-spaced pattern, which elements of the first set are in an electrically conducting connection with the supply lines 8 and 9 of a first wiring system for the structure 1. These supply lines 8 or 9 are laid upon the inner wall of structure 1, wherein each of the required lines is laid as multiple lines so as to increase the redundance of the arrangement. The individual paths of a redundant interconnection line 8, 9 are arranged in different regions of the primary structure 1 and are connected with different contact elements or members of the first set which are arranged on the inner side of the receiving bushing 3 so as to be offset against each other.

It is assured by such a spatially separate arrangement of the individual paths of an interconnecting line, that the overall arrangement not only remains functional in case of failure of one individual line path because of a technical defect, but also in the case where a partial region of the outer jacket of the primary structure 1 is mechanically damaged to such an extent by micrometeorite impact that the interconnecting lines laid there are destroyed.

An interconnection or junction member or element 10 is inserted into the cylindrical receptacle formed by the receiving bushing 3, the recess 4 and the dead end bore 5, which junction element comprises a third set of contact elements 12, 13 on the outer face of a prism, in the present case cylindrically designed, partial region 11, which contact elements of the third set are structured and arranged to be identical to the first set of contact elements 6 and 7 in their receiving bushing 3. The partial region 11 of the junction element 10 consists herein of an electrically nonconducting material. In the inserted working position of the junction elements 10 shown in the FIGURE, the contact elements 6 and 12 or 7 and 13 are actually in electrically conducting contact with each other. They are shown slightly spaced for clarity in the drawing.

The third set of contact elements 12 and 13 are in direct electrical connection by means of junction bridges 14 and 15 with an additional fourth set of contact elements 16, 17 which, in the depicted working position of the junction element 10, lie in the region of the recess 4 of the experimentation module 2. There they are in an electrically conducting connection with a second set of contact elements 18 and 19 which are retained in the recess 4 and are also configured as resilient tongues just as the contact elements 6, 7, 12, 13 and 16, 17. Finally an electrical connection is established by means of the contact elements 18 and 19 between the supply lines 8 and 9 and supply lines 20 and 21 of a second wiring system which are laid in the carrier unit 2.

The fastening of the junction elements 10 in its working position shown in the FIGURE is achieved on the one hand by a shaft extension 22 introduced into the dead end bore 5 and on the other hand by means of a terminating or end plate 23 which rests at the outer surface of the external structure 1 and is secured there by means of a pivotable latch 24, in the manner, for example, in which a ship's ports or bulkheads are secured. As can be further discerned in the FIGURE, a handle 25 is provided on the outer surface of the termination plate 23, which handle serves for manipulating the junction element 10.

The quantity of the contact elements 12 and 16 or 13 and 17 arranged at or on the junction element 10 and the connecting bridges 14 or 15 are an integral multiple of the quantity of the contact elements 6 and 7 or 18 and 19 arranged in the receiving bushing 3 as well as in the recess 4. That is, the same number or, for instance, two or three times that number.

Since the fourth set of contact units provided additionally at the junction elements 10 are arranged to be respectively circumferentially offset through a fixed angular amount with respect to the other contact units, the possibility of unlatching the junction element 10 in the case of a defect in one of these contact units, to remove same from the receptacles and to subsequently reinsert it into the receptacles turned through this same angular amount is provided. Guide profiles or ridges 26 provided in the longitudinal direction in the dead end bore 5 cooperate with matching longitudinal grooves 27 in the shaft 22 and assure that defined or preset rotary angular positions can be achieved. The cylindrical geometry of the system lends itself to this function, taking advantage of the contact element and supply line redundancy to assure continued operation even when defects arise.

The junction element 10 can be easily operated by means of the handle 25 by crew members of the orbital station or externally by a suitable manipulator.

Thus the electrical connection between the first and second structures 1, 2 can be quickly broken and again reestablished when replacing the carrier unit 2. On the other hand, the junction element 10 can be easily replaced in case of extensive damage thereto.

While the invention has been described in connection with a preferred embodiment, it will be understood that modifications thereof within the principles outlined above will be evident to those skilled in the art and thus the invention is not limited to the preferred embodiment but is intended to encompass such modifications.

What is claimed is:

1. An interconnecting electrical system comprising a first structure having a first wiring system connected to a first set of contact elements in a first receptacle, a second structure having a second wiring system connected to a second set of contact elements in a second receptacle, a removable junction element comprising a third set of contact elements and a fourth set of contact elements each connected to one of the third set, said first, second, third and fourth contact sets being structurally arranged such that, when the junction element is placed in the first and second receptacles, the first and third sets of contact elements and the second and fourth sets of contact elements are interconnected respectively thereby interconnecting the first and second wiring systems of the first and second structures.

2. The system of claim 1, wherein the first structure is an orbital station, the second structure is an experimentation carrier, and the junction element is configured to fit within the receptacles in discrete angular orientations.

3. A junction system for establishing an electrically conducting connection between a wiring system arranged at a first outer structure and an associated wiring system arranged at a second inner structure for use in manned orbital stations, said second structure being detachably retainable in the first outer structure, said first and second structures having respective approximately annularly-shaped first and second receptacles that can be axially aligned, a first set of contact elements circumferentially spaced about the first receptacle and connected to the wiring system of the first structure, a second set of contact elements circumferentially spaced about the second receptacle and connected to the wiring system of the second structure, and a removable generally prismatically shaped elongated junction element having on its outer surface circumferentially-spaced contact units arranged in such a manner that when inserted in the first and second receptacles electrical connections are established between the first and second wiring systems.

4. A junction system according to claim 3, further comprising means for latching the junction element when in its inserted position.

5. A junction system according to claim 3, wherein the contact units comprise resilient members arranged to contact the first and second contact elements and are arranged in pairs by interconnecting bridges extending in the longitudinal direction of the junction element.

6. A junction system according to claim 3, wherein the junction element can be inserted into the receptacles in a plurality of different angular positions in each of which the first and second wiring systems are interconnected.

7. A junction system according to claim 6, wherein each of the wiring systems comprise redundant supply lines connected to different contact elements.

8. A junction system according to claim 3, wherein the quantity of the contact units amounts respectively to an integral multiple of the quantity of the first and second sets of contact elements, the contact units being arranged on the circumference of the junction element so as to be offset with respect to each other through a fixed rotational angle.

9. A junction system according to claim 8, wherein the contact units are arranged at a cylindrical region of an electrically nonconductive material of the junction element.

10. A junction system according to claim 3, wherein the first receptacle is a throughbore, and the second receptacle is a blind bore.

11. A junction system according to claim 10, wherein the junction element comprises a shank-like extension configured to engage both receptacle bores.

12. A junction system according to claim 11, wherein the junction element and the blind bore have cooperating position locating structure extending in their longitudinal directions so as to allow the junction element shank to engage and seat within the bore in several rotational angular positions.

13. A junction system according to claim 3, wherein the junction element comprises a terminal plate and a handle.

14. A junction system according to claim 13, wherein latch means are provided to lock the junction element to the first structure by means of the terminal plate.

* * * * *